Dec. 3, 1946. S. H. HOBSON 2,411,993
COMBINATION BROILER AND SERVER FOR DOMESTIC RANGES
Filed Sept. 1, 1939 3 Sheets-Sheet 1
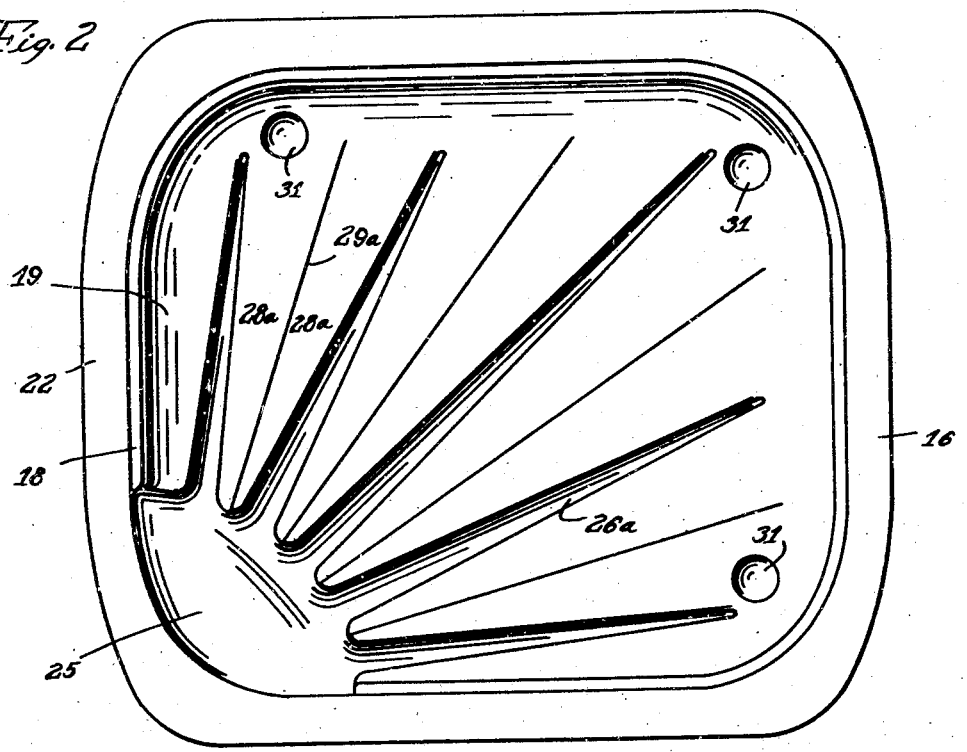
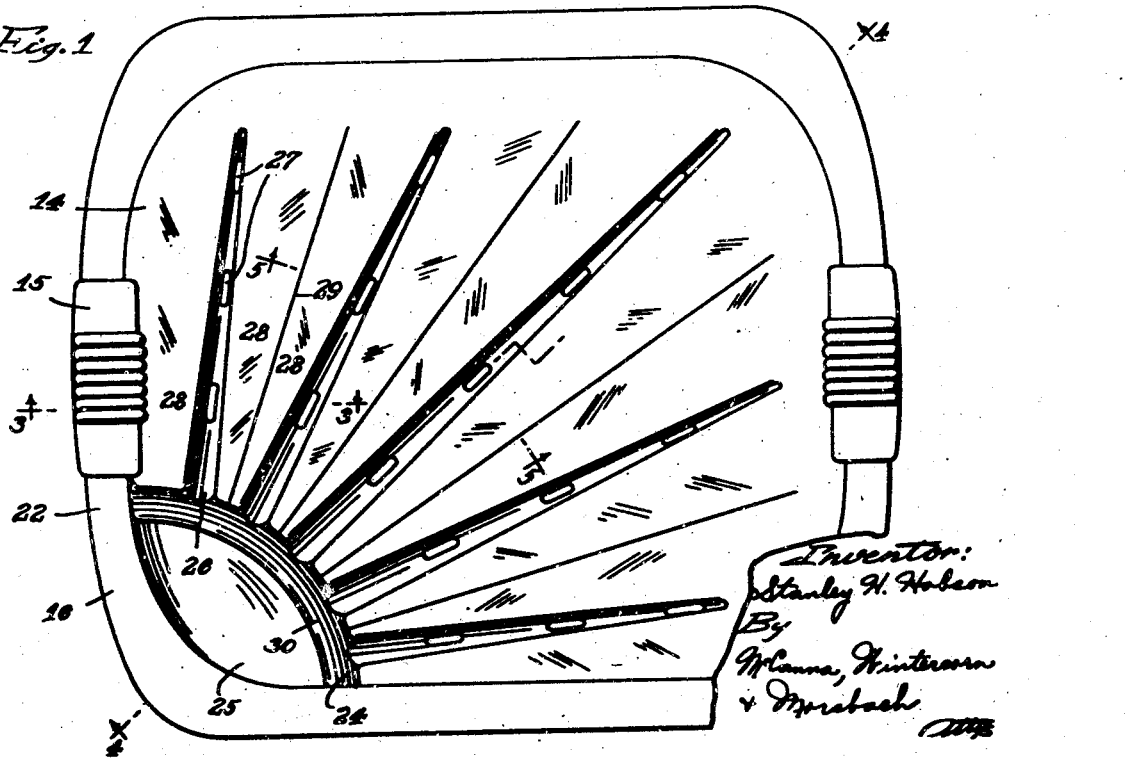

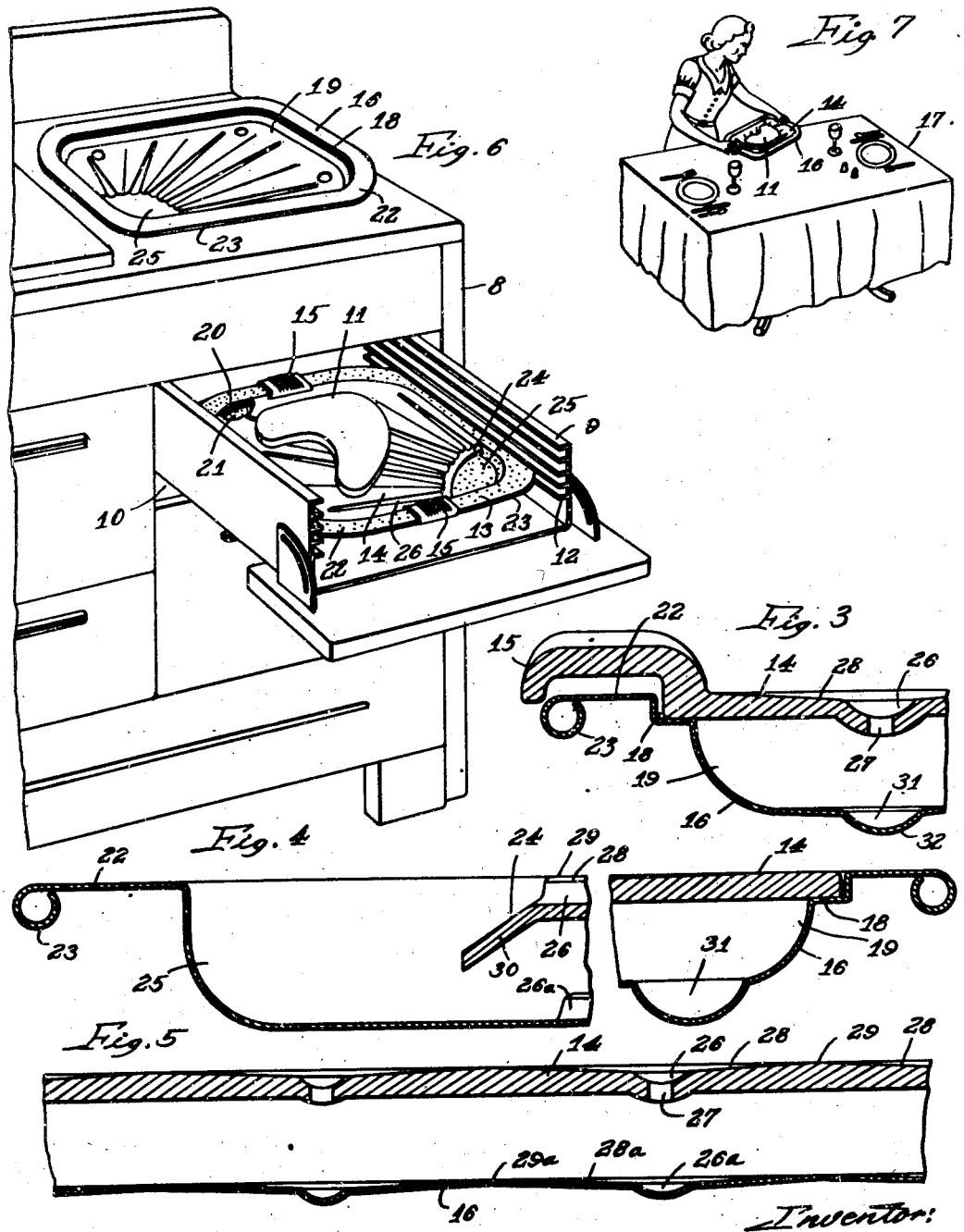

Patented Dec. 3, 1946

2,411,993

UNITED STATES PATENT OFFICE 2,411,993

COMBINATION BROILER AND SERVER FOR DOMESTIC RANGES

Stanley H. Hobson, Rockford, Ill., assignor to Geo. D. Roper Corporation, Rockford, Ill., a corporation of Illinois Application September 1, 1939, Serial No. 293,115

6 Claims. (Cl. 99—425)

This invention relates to a novel combination broiler and server for domestic ranges.

In recent times many restaurants have featured the serving of sizzling steaks and it is believed that many persons have regretted the fact that the present day domestic ranges, with all their improvements, do not provide facilities adapted for serving sizzling steaks at the table, the grills being designed so that they are not adapted to be removed from the range and placed on the table, and there being furthermore nothing provided in conjunction therewith to permit the placing of the hot grill on the table. It is therefore the principal object of my invention to provide a combination broiler and server constructed so that the hot grill bearing the steak can be transferred promptly directly from the broiler compartment in a serving tray to the table without danger of scorching the table, the grill being made to fit in the tray used on the table similarly as it fits in the drip pan in the range and being equipped with handles on opposite sides thereof to facilitate transferring the grill from the drip pan to the serving tray.

The invention also contemplates improvements in the construction of the grill as well as in the construction of the drip pan and serving tray with a view to generally improving the performance, as will hereinafter appear. It also contemplates the construction of the grill from various materials to adapt the same better to the serving of sizzling steaks as will later appear.

The invention is illustrated in the accompanying drawings, in which—

Fig. 1 is a plan view of the broiler grill and serving tray assembly;

Fig. 2 is a plan view of the tray with the grill removed;

Figure 8:
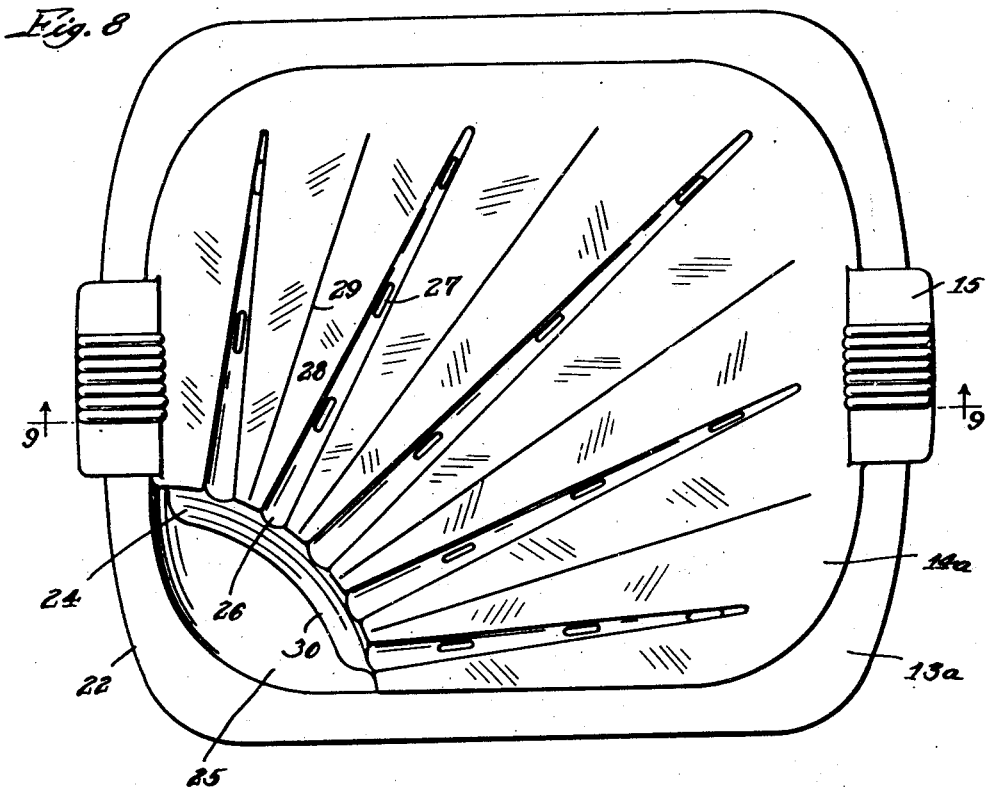

Figs. 3, 4, and 5 are sections on a larger scale taken on the correspondingly numbered lines of Fig. 1, Fig. 4 having an intermediate portion thereof broken away to permit showing the construction on the enlarged scale;

Fig. 6 is a perspective view of a portion of a range illustrating the invention under actual operating conditions at the point where the grill is to be transferred from the drip pan to the serving tray;

Fig. 7 is a perspective view of a table illustrating the placing of the grill and serving tray assembly on the table with the sizzling steak thereon;

Fig. 8 is a plan view of another broiler grill and drip pan assembly; and

Figure 9:
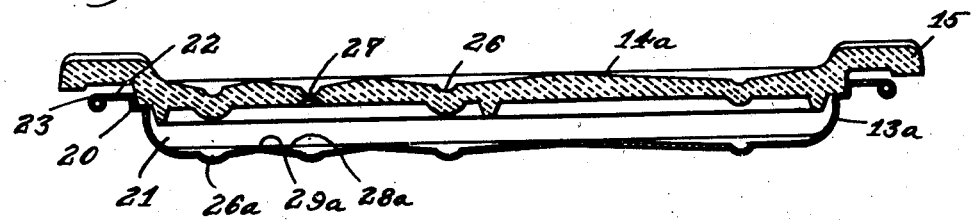

Fig. 9 is a longitudinal section on the line 9—9 of Fig. 8.

Similar reference numerals are applied to corresponding parts throughout the views.

Referring first to Figs. 6 and 7, the numeral 8 designates a domestic range having a broiler drawer 9 slidable into and out of the broiler compartment 10 in which a gas burner or electric heating element is provided at a proper elevation with respect to the steak 11, or other food to be prepared. The drawer 9 has ledges 12 in vertically spaced relation to permit placing the drip pan 13 with the grill 14 therein at the desired elevation for slower or faster broiling. The grill 14 has handles 15 on the opposite ends thereof to facilitate removal from the drip pan 13 when the hot grill bearing the sizzling steak is to be placed in the serving tray 16 and placed on the table 17, as indicated in Fig. 7. Obviously the circumferential ledge 18 around the depressed central portion 19 of the tray 16 is made to fit the grill 14, just as a similar ledge 20 around the depressed central portion 21 of the drip pan 13 fits the grill. In fact the pan 13 and tray 16 are preferably alike in construction, both being stamped from sheet metal, and having a marginally projecting rim portion 22 with a rolled outer edge 23. The pan 13, however, is porcelain enameled, both for cheapness and for making it better adapted to withstand the range temperatures, whereas the tray 16 is of stainless steel or chromium plated steel, mainly for attractive appearance in view of its use on the table, although the tray may be made of pottery, glass, or any of the other materials used in the construction of the grill 14, with a view to having the same match the appearance of the grill when assembled therewith, as illustrated in Fig. 7. In any event it is apparent that the present invention makes it feasible to serve sizzling steaks and the like in the home and thereby broadens the scope of usefulness of the domestic range which was heretofore not adapted for that purpose. When the hot grill bearing the sizzling steak is transferred to the table directly from the broiler compartment in the tray 16, the tray being cold facilitates the handling of the grill and the carrying thereof to the table and protects the table against scorching so that there is no necessity for the use of special pads, which are always a nuisance. Furthermore, the tray protects the table cloth against grease spots. One corner of the grill 14 is cut away on an arc, as indicated at 24, to afford access to a well 25 in the corner of the pan 13 and tray 16, and in operation, while the grill 14 is in the broiler compartment, uncooked juices collect in the well 25 in the pan 13 in the manner hereinafter described and these juices can be ladled out and poured over the meat on the grill, as in basting, or used in the preparation of gravy. The fact that the grill 14 is transferred from the pan 13 to a clean tray 16 when the steak is to be served is also considered quite an advantage, this assembly having a much more wholesome appearance. The grill 14 illustrated is of cast aluminum although it may be stamped from sheet aluminum. I also contemplate having the grill made of pottery, heat resistant glass, or stamped steel. Thus, for example, in Figs. 8 and 9 the grill 14a is of pottery and is shown on a porcelain enameled sheet metal drip pan 13a, the grill 14a being adapted for use interchangeably like the grill 14 on the drip pan 13a and on a serving tray similar in construction to the drip pan 13a but having a different finish, like the serving tray 16, the grill 14a being in the drip pan 13a during the broiling operation in the oven of the range and being transferred after the broiling operation to a clean serving tray to convey the sizzling steak or other meat to the table, similarly as in the case of the grill 14. The pottery of the grill 14a is of advantage from the standpoint that it can be thoroughly cleaned easily, the same as other cooking utensils made of pottery or glass or the like. The grill 14a being of substantially identical construction to the grill 14 has the parts thereof numbered correspondingly, and the same is true regarding the numbering of the parts of the drip pan 13a in relation to the numbering of the drip pan 13 and serving tray 16. Where the stamped steel grill construction is used, the grill may be of stainless steel or chromium plated, or even enameled.

The grill 14 has, radiating from the arcuate cut-out corner portion 24, a series of grooves 26 which are shallowest at the ends remote from the corner portion 24 and deepest where they communicate with the corner portion, as indicated by the flaring thereof. The grill has slots 27 provided therein communicating with the bottoms of the grooves 26 and located in longitudinally spaced relation in said grooves. The top of the grill has sloping surfaces 28 inclined toward the grooves, these surfaces defining edges as indicated by the radial lines 29, midway between the adjacent grooves. The edges 29 are all in a plane above the laterally sloping surfaces 28 and grooves 26, giving ample opportunity for juices to run down into the grooves and to be collected in the well 25. An arcuate downwardly projecting flange 30 on the grill defines the arcuate cut-out portion 24 and the juices running from the ends of the grooves 26 run down this annular flange and drop off into the well as should be apparent in Fig. 4. The drip pan 13 and serving tray 16 alike have radiating from the corner well 25 a series of grooves 26a, all in vertical alignment with the grooves 26 in the grill, these grooves 26a being likewise shallowest remote from the well and deepest where they communicate with the well, as indicated by the flaring thereof, whereby to assure good drainage of juices into the well, the juices being what find their way through the slots 27 in the grill. The pan 13 and tray 16 have laterally sloping surfaces 28a corresponding to the surfaces 28 of the grill, the oppositely sloping surfaces between adjacent grooves defining the straight edges along radial lines midway between adjacent grooves, as indicated at 29a. Depressed portions 31 at the three other corners of the pan 13 and tray 16 provide supporting feet 32 in a common plane with the bottom of the well portion 25 so that the tray 16 will set level on the table 17. With this construction of the grill and pan, it is obvious that the greases are baffled from the flame of the broiler burner so that they won't ignite or smoke, that being one of the principal objections to many other grills with which I am familiar. In passing it will also be noticed in Fig. 3 that the handles 15 have the main body portions thereof disposed in a plane well above the plane of the grill 14 so as to be disposed in spaced relation above the rim portion 22 of the drip pan 13 and thereby facilitate lifting the grill off the pan, the usual pot holders being used in this operation as well as in carrying the grill and tray assembly to the table to avoid burning the hands and fingers.

It is believed the foregoing description conveys a good understanding of the objects and advantages of my invention. The appended claims have been drawn with a view to covering all legitimate modifications and adaptations.

I claim:

1. In a broiler, a pan having side flanges and a depressed central portion which is further depressed at one corner thereof to provide a well, a broiler grill fitting in the depressed central portion of the pan and having a cut-away corner portion exposing the well, the grill having elongated grooves provided in the top surface thereof, radiating from the cut-away corner portion thereof, for drainage of juices toward and into said well, said grill also having openings provided therein communicating with the grooves and in longitudinally spaced relation with respect thereto, the corner portion of the grill being defined by a downwardly projecting flange, the lower edge of which is in sufficiently closely spaced relation to the bottom of the pan so that the flange in addition to conducting juices from the ends of the grooves in the grill into the well in the corner of the pan substantially baffles the rest of the depressed central portion of the pan from the flame of the broiler burner.

2. In a broiler, a pan having side flanges and a depressed central portion which is further depressed at one corner thereof to provide a well, a broiler grill fitting in the depressed central portion of the pan and having a cut-away corner portion exposing the well, the grill having elongated grooves provided in the top surface thereof, radiating from the cut-away portion thereof, for drainage of juices toward and into said well, said grill also having openings provided therein communicating with the grooves and in longitudinally spaced relation with respect thereto, said pan having grooves formed in the bottom of the depressed central portion thereof radiating from and draining toward the corner well, said grooves being in vertical alignment with the grooves in the grill and being adapted to catch drippings from the aforesaid openings.

3. In a broiler, a pan having side flanges and a depressed central portion which is further depressed at one corner thereof to provide a well, a broiler grill fitting in the depressed central portion of the pan and having a cut-away corner portion exposing the well, the grill having elongated grooves provided in the top surface thereof, radiating from the cut-away portion thereof, for drainage of juices toward and into said well, said grill also having openings provided therein communicating with the grooves and in longitudinally spaced relation with respect thereto, said pan having grooves formed in the bottom of the depressed central portion thereof radiating from and draining toward the corner well, said grooves being in vertical alignment with the grooves in the grill and being adapted to catch drippings from the aforesaid openings, the cut away corner-portion of said grill being defined by a downwardly projecting flange, the lower edge of which is disposed in sufficiently closely spaced relation to the bottom of the pan so that the flange in addition to conducting juices from the ends of the grooves in the grill into the well in the corner of the pan substantially baffles the rest of the depressed central portion of the pan from the flame of the broiler burner.

4. In a broiler, a generally rectangular pan having a depressed central portion which is further depressed in one corner thereof to provide a well, a generally rectangular broiler grill fitting in the depressed central portion of the pan and having a cut-away corner portion exposing the well, said grill having a plurality of grooves provided in the top thereof radiating from the cut-away corner portion in substantially uniformly spaced relation, the grooves all being of gradually increasing width and depth toward their inner ends where they communicate with the cut-away corner portion of the grill to facilitate drainage of juices toward and into said well, and the top surface of the grill being formed between the grooves to provide oppositely sloping surfaces inclined downwardly toward the grooves associated therewith, said sloping top surfaces intersecting on substantially radial lines radiating from the cut-away corner portion of the grill, said sloping top surfaces serving to conduct juices toward and into said grooves, and said grill having openings provided therethrough in the bottoms of the grooves and in longitudinally spaced relation with respect thereto for direct drainage of juices into the pan through the grill, the depressed central portion of the pan providing surfaces in vertically spaced relation to the bottom of the grill sloping downwardly toward the well for drainage of juices toward and into said well.

5. In a broiler, a generally rectangular pan having a depressed central portion which is further depressed in one corner thereof to provide a well, a generally rectangular broiler grill fitting in the depressed central portion of the pan and having a cut-away corner portion exposing the well, said grill having a plurality of grooves provided in the top thereof radiating from the cut-away corner portion in substantially uniformly spaced relation, the grooves all being of gradually increasing width and depth toward their inner ends where they communicate with the cut-away corner portion of the grill to facilitate drainage of juices toward and into said well, and the top surface of the grill being formed between the grooves to provide oppositely sloping surfaces inclined downwardly toward the grooves associated therewith, said sloping top surfaces intersecting on substantially radial lines radiating from the cut-away corner portion of the grill, said sloping top surfaces serving to conduct juices toward and into said grooves, and said grill having openings provided therethrough in the bottoms of the grooves and in longitudinally spaced relation with respect thereto for direct drainage of juices into the pan through the grill, said pan having a plurality of grooves provided in the depressed central portion thereof radiating from the corner well and in substantially uniformly spaced relation to one another and in vertical alignment with the radiating grooves in the grill, whereby to catch drippings from the openings in said grill, the grooves in said pan all being of gradually increasing width and depth toward their inner ends where they communicate with the well, whereby to facilitate drainage of juices toward and into said well.

6. A broiler food support comprising, in combination, a drip pan having a dished central portion forming a drain receptacle, and a generally flat slab of pottery material removably seated on said pan above said dished portion, presenting a top surface to receive directly on it the food to be broiled, said slab by reason of the inherent characteristics of the pottery material thereof forming a heat insulating barrier overlying the contents of said drain receptacle.

STANLEY H. HOBSON.